Figure 5:
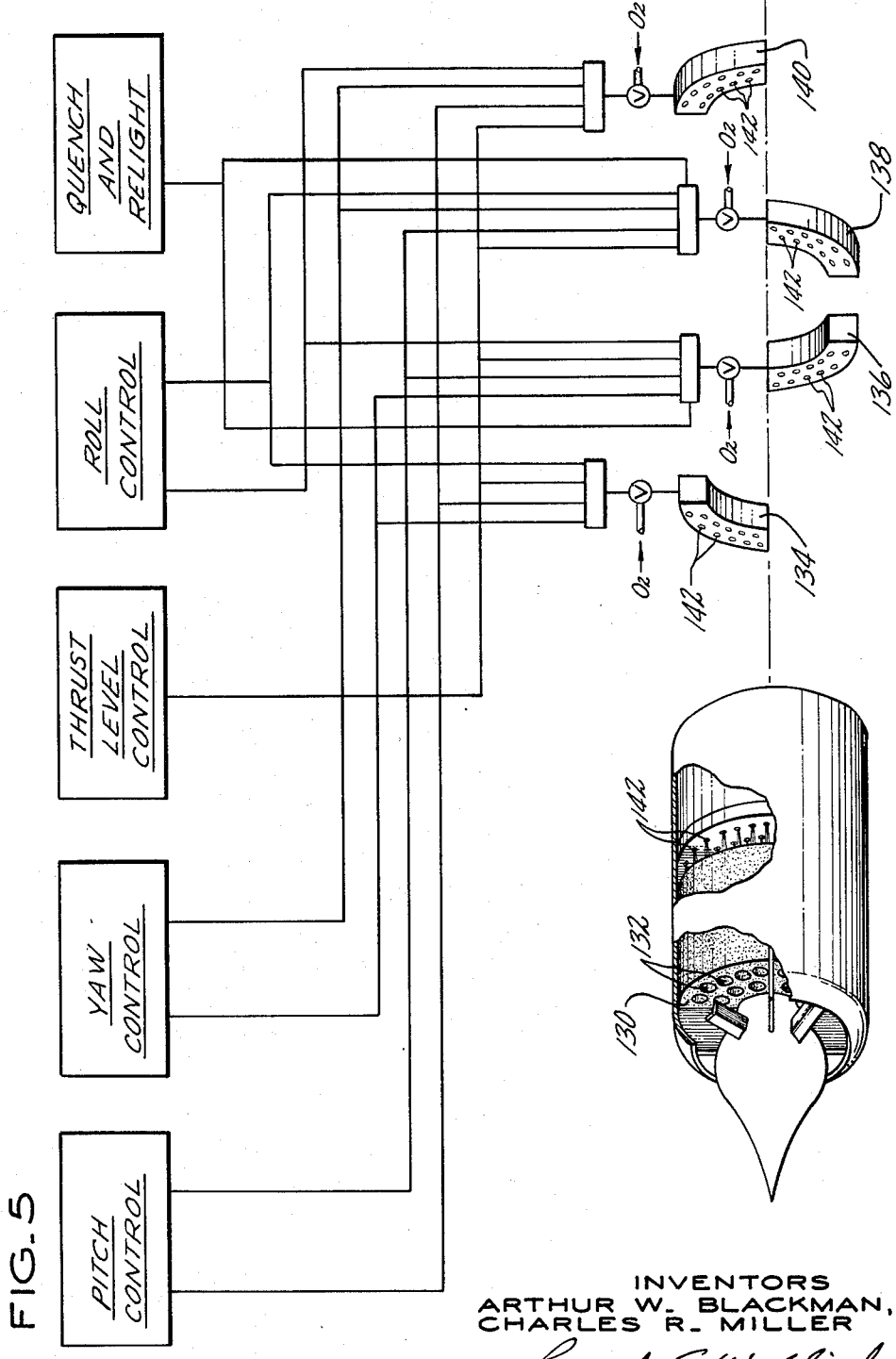

Aug. 18, 1964   A. W. BLACKMAN, JR., ETAL   3,144,751
HYBRID ROCKET
Filed May 10, 1961   3 Sheets-Sheet 1
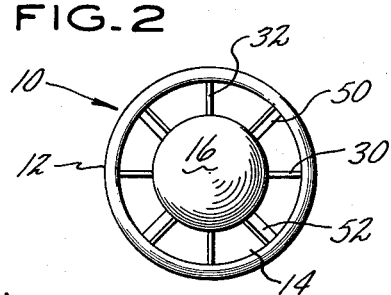
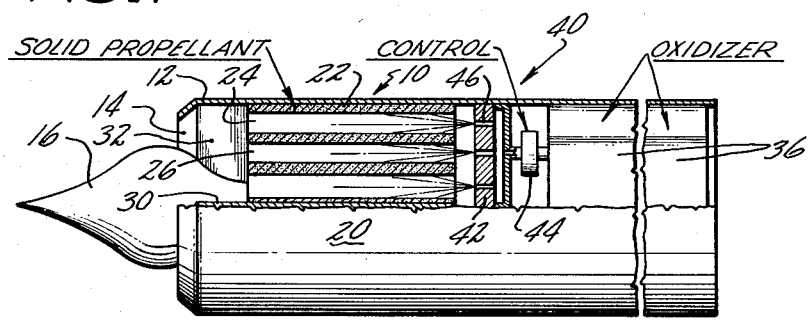
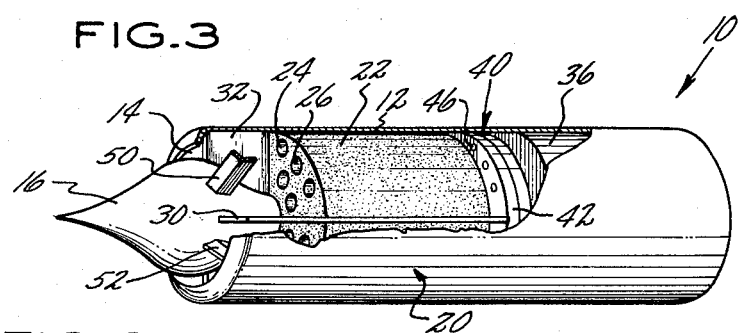
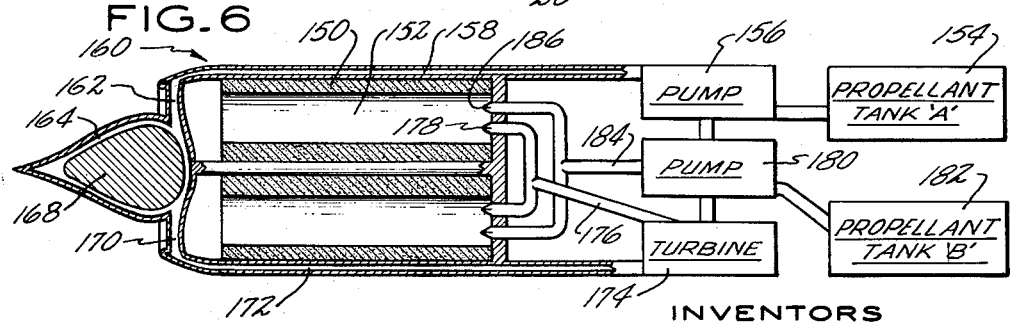
INVENTORS
ARTHUR W. BLACKMAN, JR.
CHARLES R. MILLER
BY Leonard E. Wekelund
ATTORNEY Aug. 18, 1964  A. W. BLACKMAN, JR., ETAL  3,144,751
HYBRID ROCKET
Filed May 10, 1961  3 Sheets-Sheet 2

FIG. 4

INVENTORS
ARTHUR W. BLACKMAN, JR.
CHARLES R. MILLER
BY Leonard F. Weklind
ATTORNEY Aug. 18, 1964   A. W. BLACKMAN, JR., ETAL   3,144,751
HYBRID ROCKET
Filed May 10, 1961   3 Sheets-Sheet 3

INVENTORS
ARTHUR W. BLACKMAN, JR.
CHARLES R. MILLER
BY Leonard F. Weeklind
ATTORNEY

United States Patent Office 3,144,751
Patented Aug. 18, 1964

3,144,751
HYBRID ROCKET
Arthur W. Blackman, Jr., Manchester, and Charles R. Miller, Rockville, Conn., assignors to United Aircraft Corporation, East Hartford, Conn., a corporation of Delaware
Filed May 10, 1961, Ser. No. 109,202
12 Claims. (Cl. 60—35.6)

This invention relates to rocket vectoring systems and more particularly to rockets using a plurality of fuels and especially hybrid rockets wherein one of the propellants is a solid.

It is a primary object of this invention to provide a vector control system for a rocket, which system presents a much lighter weight and/or far smaller losses than other known vector systems. A more specific object of this invention is to provide a superior thrust vectoring control system for hybrid rockets and those particularly having plugged nozzles.

It is a still further object of this invention to provide a hybrid rocket system having a solid propellant section in segmented form and means for varying the flow of liquid propellant in each of the segments so that fixed deflection means can be utilized in the exhaust nozzle to provide a simple lightweight control.

These and other objects of this invention will become readily apparent from the following detailed description of the drawings in which:

FIG. 1 is a side view of a rocket assembly in partial section;
FIG. 2 is a rear view of FIG. 1;
FIG. 3 is a partial perspective illustration of FIG. 1 illustrating the deflector vanes in the exhaust nozzle;
FIG. 4 is a schematic and diagrammatic illustration of a rocket and vector control system;
FIG. 5 is a modified rocket arrangement with a vectoring control system similar to FIG. 4; and
FIG. 6 is a schematic illustration of a tri-propellant hybrid rocket.

Most thrust vectoring systems require an arrangement which requires heavy equipment or induces high losses; thus, for example, movable vanes have been used in the exhaust stream for deflecting the latter. Also gimbaled nozzle arrangements have been utilized between these required high loaded servo units. Fluid streams ejected from a secondary source have been utilized to deflect the main exhaust flow or to create shock waves therein. But these also are interruptable-type devices which cause a certain amount of loss and require special valving.

Referring to FIG. 1, a portion of a rocket power plant is illustrated generally at 10. The rocket includes an outer casing 12, which terminates in an aft exhaust opening 14 formed as an annulus between the casing 12 and the streamline central plug 16.

Combustion section 20 comprises a solid propellant 22 which is formed with a plurality of axial passages 24 and 26.

The solid propellant and the exhaust nozzle opening 14 are divided into segments by a number of partitions 30 and 32 as better seen in FIGS. 2 and 3.

An oxidizer tank 36 (FIG. 1) is provided and may comprise a suitable liquid under pressure. A header generally indicated at 40 is provided for each quadrant or segment of the solid propellant section. Thus the injector portion 42 is in the form of a quadrant and receives oxidizer from a throttling-type control 44. By means of the control 44 the flow of oxidizer leading to the passages 24 and 26 in the solid propellant combustion chamber can be varied as desired. Suitable nozzles 46 are provided in the header segment 42. By regulating the flow of oxidizer to the passages 24 and 26 the burning rate of the solid propellant and hence the thrust output can be varied accordingly.

As best seen in FIGS. 2 and 3, each of the quadrants of the exhaust nozzle section include one or more deflector vanes 50 and 52. Each of the adjacent deflector vanes in adjacent quadrants or segments turn the flow slightly in opposite directions. Thus when the oxidizer flow through adjacent combustion sections and exhaust nozzle sections or quadrants are identical, the thrust level will be identical and the vectoring forces of the deflector vanes will cancel each other.

However, by varying the oxidizer flow by means of control 44, in any one quadrant there will be differential or vectoring forces between adjacent deflector vanes 50 and 52 to provide a directional control for the rocket.

FIG. 4 illustrates a schematic partially exploded view of a typical control system for a quadrant type oxidizer arrangement. In this instance the solid propellant and combustion section 60 is formed into annular quadrants or segments 62 and 64, respectively. While the oxidizer header is arranged into the centrally-located quadrants 66, 68, 70 and 72, respectively, these quadrants are separated in an exploded view arrangement to more clearly indicate the various control functions illustrated in the block diagram portion. Thus it can be seen that for pitch control, a pitch control signal flows from the control position 76 via lines 78 to the lines 80 and 82 which lead to mixing amplifiers 84 and 86, respectively. The amplifiers 84 and 86 control oxidizer flow valves 90 and 92 leading to the upper two quadrants 66 and 72. This control signal thus will vary the oxidizer flow and the thrust through the upper two exhaust nozzle quadrants to cause the vehicle to pitch up or down. Likewise a pitch control signal can be fed from the line 96 to mixing amplifiers 98 and 100 leading to oxidizer control valves 102 and 104, connected to the lower oxidizer quadrants 68 and 70. Obviously the variation of the flow in these last two quadrants will also vary the pitch of the vehicle. Likewise yaw control signals can be conducted to the pair of oxidizer quadrants 66 and 68 of the oxidizer quadrants 70 and 72. The thrust level control 110 is connected to all four quadrants 66, 68, 70, and 72 to vary the thrust level of the vehicle. The roll control 114 may be connected to diametrically opposed quadrants 68 and 72, and 66 and 70.

The quench and relight control 118 to provide starts and stops of the rocket engine is connected to all four of the oxidizer quadrants in a manner much similar to the connection of the thrust level control.

Whereas the arrangement of FIG. 4 provides for annular combustion segments and annular passage arrangements for the oxidizer flow, FIG. 5 discloses solid propellant segments or quadrants such as 130 which include a plurality of passages 132 similar to those shown in FIGS. 1 through 3. In this instance the oxidizer header is constructed in the form of enclosed segments 134, 136, 138 and 140 with each having a number of nozzle passages such as 142. The control arrangement of FIG. 5 is substantially identical to that of FIG. 4.

FIG. 6 illustrates a tri-propellant hybrid rocket motor arrangement similar to that shown in FIGS. 1 through 5. However, in the instance of the FIG. 6 two fluid propellants are provided. In this instance a solid propellant 150 such as beryllium is provided with a plurality of passages 152 which again are located in different quadrants. In this instance a propellant tank 154 is provided with a pump 156 which drives the propellant such as hydrogen through cooling passages 158 in the outer casing 160 of the rocket through struts 162 through the passage 164 of the plug 168 and then via passages 170 and 172 to turbine 174. The heated hydrogen then drives the turbine and flows through the passage 176 to one or more nozzles 178 in each of the particular combustion quadrants. The turbine 174 drives the pump 180 and the pump 156. The pump 180 pumps propellant from the tank 182 through passage 184 to one or more nozzles 186 in each of the combustion quadrants.

A control system similar to that illustrated in FIGS. 4 and 5 may be provided to control the flow of both fluid propellants to each of the quadrants of the combustion section.

As the result of this invention it can be shown that the losses in specific impulse of a plug nozzle arrangement of this system are approximately only 1.2% of that experienced in a gimbaled nozzle system, 3.9% of the loss in a shock control system and only 2.4% of the loss in a "jetavator" system for any given represented jet deflection angle. This represents a significant improvement in control forces with a minimum of losses.

Although several embodiments of this invention have been illustrated and described herein, it will be apparent that various changes may be made in the construction and arrangement of the various parts without departing from the scope of the novel concept.

We claim:

1. In a hybrid rocket powerplant having a solid propellant and a source of liquid propellant, means for dividing a solid propellant into symmetrical segments about the axis of the powerplant, reaction means in the exhaust stream from each of the segments, and means for varying the flow of liquid propellant through each of said segments for varying the reaction rate of propellants in one segment with respect to another of said segments and thereby varying the resultant forces on the respective reaction means.

2. In a hybrid rocket powerplant having a solid propellant and a source of liquid propellant, means for dividing a solid propellant into symmetrical segments about the axis of the powerplant, an exhaust duct including means dividing said duct into a plurality of annular segments each receiving gases from one of said symmetrical segments, reaction means in each of said annular segments including deflector means spanning a portion of said segments, and means for controlling the flow of liquid propellant through each of said segments for varying the reaction rate of propellants in said segments and the resultant forces on said reaction means.

3. In a hybrid rocket powerplant having a solid propellant and a source of liquid propellant, means for dividing a solid propellant into symmetrical segments about the axis of the powerplant, reaction means in the exhaust stream from each of the segments, means for controlling the flow of liquid propellant through each of said segments for varying the reaction rate of propellants in said segments and the resultant forces on said reaction means including segmental fluid propellant discharge elements, valve means regulating the flow of liquid propellant from said source to said elements, means for sensing the attitude of said vehicle, and means connecting said sensing means to said valve means.

4. A rocket powerplant comprising a solid propellant including passages therein forming combustion chambers, means dividing the solid propellant into a plurality of segments about the axis thereof, a source of fluid propellant, means for injecting fluid propellants from said source into the passages of each of said segments, aerodynamic means fixed in the exhaust stream flowing from each of said segments for creating a control moment about said axis, and means for selectively varying the flow of fluid propellant through each of said segments to provide vectoring forces on the rocket with respect to said axis.

5. A rocket powerplant comprising a solid propellant including passages therein forming combustion chambers, means dividing the solid propellant into symmetrical segments about the axis thereof, a source of fluid propellant, means for injecting fluid propellants from said source into the passages of each of said segments, an exhaust nozzle receiving gases from said combustion chamber including a central streamlined plug forming an annular exhaust passage, means dividing said exhaust passage into a plurality of segments, aerodynamic means fixed in the exhaust stream flowing in each of said exhaust segments for creating a deflection of the gases relative to said axis, and control means for selectively varying the flow of fluid propellant through each of said segments to provide vectoring forces on the rocket with respect to said axis.

6. A rocket powerplant according to claim 5 including means for sensing at least one parameter of flight attitude of the vehicle for regulating said control means.

7. A rocket powerplant comprising a solid propellant including passages therein forming combustion chambers, means dividing the solid propellant into a plurality of segments about the longitudinal axis thereof, two sources of different fluid propellants, means for injecting fluid propellants from said sources into the passages of each of said segments therefor, aerodynamic means fixed in the exhaust stream flowing from each of said segments for creating a moment about said axis, and means for selectively varying the flow of said fluid propellants through each of said segments to provide vectoring forces on the rocket with respect to said axis.

8. In a rocket powerplant having a plurality of propellant sources, a combustion zone, means for dividing the combustion zone into segmented portions with respect to the longitudinal axis of the combustion zone, an exhaust nozzle receiving gases from the combustion zone, a plug in said nozzle, deflector means carried by said plug in the path of the gas flowing from each of said segments, adjacent deflector means diverting a portion of the exhaust gases in opposed direction, means for injecting the propellant from said sources into said combustion zone, and means for selectively controlling the rate of propellant flow from at least one of said sources to each of said segments.

9. In a rocket powerplant having a plurality of propellant sources, a combustion zone, means for dividing the combustion zone into segmented portions with respect to the longitudinal axis of the combustion zone, an exhaust nozzle receiving gases from the combustion zone, a plug in said nozzle including partitions forming four nozzle segments, deflector means carried by said plug in the path of the gas flowing from each of said nozzle segments, adjacent deflector means diverting a portion of the exhaust gases in opposed directions, means for injecting the propellant from said sources into said combustion zone, and means for selectively controlling the rate of propellant flow from at least one of said sources to each of said segments including valve means between said one source to said combustion zone, and flight direction sensitive means for regulating said valve means.

10. In a rocket powerplant having a plurality of propellant sources, a combustion zone comprising a solid propellant having passages therein, means for dividing the combustion zone into segmented portions with respect to the longitudinal axis of the combustion zone, an exhaust nozzle receiving gases from the combustion zone, a plug in said nozzle, deflector means carried by said plug in the path of the gas flowing from each of said segments, adjacent deflector means diverting a portion of the exhaust gases in opposed directions, means for injecting the propellant from said sources into said combustion zone for reaction with the solid propellant in said passages, means for selectively controlling the rate of propellant flow from at least one of said sources to each of said segments, means for circulating propellant from one of said sources adjacent said exhaust nozzle to cool the latter and heat the propellant, and means for injecting the heated propellant into said combustion zone.

11. A rocket powerplant according to claim 10 including a turbine driven by said heated propellant.

12. A rocket powerplant according to claim 11 including pump means driven by said turbine for pumping propellant from said sources to said combustion zone.

References Cited in the file of this patent

UNITED STATES PATENTS

| | | |
|---|---|---|
| 2,906,094 | Damon et al. | Sept. 29, 1959 |
| 2,923,126 | Precoul | Feb. 2, 1960 |
| 2,979,891 | Widell | Apr. 18, 1961 |
| 2,984,973 | Stegelman | May 23, 1961 |
| 2,996,880 | Greiner | Aug. 22, 1961 |
| 3,017,743 | Adelman | Jan. 23, 1962 |